(12) United States Patent
Stacy et al.

(10) Patent No.: US 6,712,064 B2
(45) Date of Patent: Mar. 30, 2004

(54) COOKING OVEN WITH IMPROVED HEAT DISTRIBUTION MANIFOLD SYSTEM

(75) Inventors: Robert M. Stacy, Sandusky, OH (US); Scott M. Kane, Sandusky, OH (US); Charles McVeagh, Huron, OH (US); Ramesh M. Gunawardena, Chagrin Falls, OH (US)

(73) Assignee: FMC Technologies Inc., Chicago, IL (US)

( * ) Notice: Subject to any disclaimer, the term of this patent is extended or adjusted under 35 U.S.C. 154(b) by 123 days.

(21) Appl. No.: 09/954,503

(22) Filed: Sep. 14, 2001

(65) Prior Publication Data
US 2003/0051722 A1 Mar. 20, 2003

(51) Int. Cl.[7] ............................................. F24C 15/32
(52) U.S. Cl. ..................... 126/21 A; 99/443 L; 432/145
(58) Field of Search .......................... 126/21 A, 21 R, 126/15 A; 99/443 R, 443 C, 386, 401; 219/388, 400; 34/212, 216, 223, 230; 432/145, 148

(56) References Cited

U.S. PATENT DOCUMENTS

| | | | | |
|---|---|---|---|---|
| 4,965,435 A | * | 10/1990 | Smith et al. | 219/388 |
| 5,211,106 A | * | 5/1993 | Lucke | 99/441 |
| 5,231,920 A | * | 8/1993 | Alden et al. | 126/21 A |
| 5,683,240 A | * | 11/1997 | Smith et al. | 99/443 C |
| 5,832,812 A | * | 11/1998 | Wolfe et al. | 126/21 A |
| 6,131,559 A | * | 10/2000 | Norris et al. | 126/21 A |

FOREIGN PATENT DOCUMENTS

| | | | |
|---|---|---|---|
| DE | 27 09 068 A1 | * | 9/1978 |
| WO | WO 99/61843 A1 | * | 12/1999 |

* cited by examiner

Primary Examiner—Josiah Cocks
(74) Attorney, Agent, or Firm—Pauley Petersen & Erickson

(57) ABSTRACT

A cooking oven manifold system includes a conveyor extending through a housing and a plurality of air manifolds positioned above and below the conveyor, each air manifold having a pair of sidewalls extending between a back wall and an inlet. A pair of outlet nozzles extend along a length of each air manifold. An angled surface between each pair of outlet nozzles extends along a length of the air manifold. Each air manifold is additionally spaced apart from each adjacent air manifold to create an air gap between sidewalls of adjacent air manifolds.

20 Claims, 11 Drawing Sheets

COOKING OVEN WITH IMPROVED HEAT DISTRIBUTION MANIFOLD SYSTEM

BACKGROUND OF THE INVENTION

1. Field of the Invention

This invention relates to a manifold system for directing air flow across a conveyor within a cooking oven for cooking of food products.

2. Description of Prior Art

Linear cooking ovens for cooking food typically include a conveyor or conveyor belt for conveying food to be cooked from an inlet to an outlet and through a cooking chamber. A heat source, air mover and heat exchanger are typically provided within the cooking chamber for cooking the food provided on the conveyor.

Existing linear cooking ovens are typically difficult to maintain and clean because of condensate, oil droplets and other fluids and particles that may accumulate in and around the heat exchanger. As a result, costly line interruptions and/or disassembly are necessary to maintain the rigid hygienic standards required for such linear cooking ovens. Cleaning and maintenance on existing linear cooking ovens often involves heat exchangers that fold or rotate into a cleaning position thereby requiring flexible hoses, connections and other components to permit ease of movement of the heat exchanger.

In addition, a uniform and consistent cooking environment is difficult to maintain in existing cooking ovens because of a lack of proper air flow, recirculation, heat exchange and other factors.

SUMMARY OF THE INVENTION

It is therefore an object of this invention to provide a cooking oven that provides uniform and controllable cooking conditions within a cooking chamber and/or along a conveyor.

It is another object of this invention to provide a cooking oven having components that are modular.

It is another object of this invention to provide a cooking oven which is easily cleaned.

It is still another object of this invention to provide a cooking oven that separates the heat exchanger from the conveyor so that food on the conveyor is not contaminated by discharge and/or accumulations on the heat exchanger.

It is yet another object of this invention to provide a cooking oven that utilizes return air from the conveyor into continuous cycles of air flow through an air distribution system.

A linear cooking oven according to one preferred embodiment of this invention is preferably a modular oven which may have any desired number of interchangeable modules. The cooking oven preferably includes a housing having an inlet and an outlet and an enclosed chamber. A conveyor extends between the inlet and the outlet and through the chamber.

An air distribution system is positioned in fluid communication with the chamber and may include one or more blowers or other devices for circulating conditioned air throughout the chamber. The air distribution system is preferably positioned above the conveyor and adjacent a curved heat exchanger. The curved heat exchanger directs air from the air distribution system through the chamber and across the conveyor. The curved heat exchanger preferably includes an air inlet and an air outlet positioned in a non-linear relationship relative to the air inlet with at least a partially curved surface between air the inlet and the air outlet.

As a result of the described configuration of the cooking oven, the curved heat exchanger preferably directs air flow from a top portion of chamber to a lower portion of chamber and across the conveyor. One or more air manifolds are preferably connected with respect to the cooking oven so as to more precisely direct air flow from the air distribution system to the conveyor. Preferably, a plurality of air manifolds are positioned along the conveyor, preferably both above and below the conveyor.

Each air manifold includes a pair of sidewalls extending between a back wall and an inlet of the respective air manifold. A pair of outlet nozzles preferably extend along a length of each air manifold between the back wall and the inlet. In addition, in an alternate embodiment of this invention, an angled surface within each outlet nozzle preferably extends along a length of the air manifold. In arrangements of multiple air manifolds, each air manifold is spaced apart from each adjacent air manifold to create an air gap between sidewalls of adjacent air manifolds. Air directed through the air manifolds impinges on the food items on the conveyor where heat is drawn out into the food items. The cooled return air is then delivered through the air distribution system. Return air from the conveyor is delivered through the plurality of air gaps between the air manifolds.

According to one preferred embodiment of this invention, the cooking oven further includes a damper system comprising a plurality of louvers connected with respect to at least one upper manifold and at least one lower manifold. The plurality of louvers is adjustable to control the air flow between the upper manifold and the lower manifold. A manual or electronic adjustment arm may be affixed with respect to the plurality of louvers to route air flow between the upper manifold and the lower manifold. Preferably, when at least one louver in the upper manifold is opened, at least one other corresponding louver is closed in the lower manifold.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
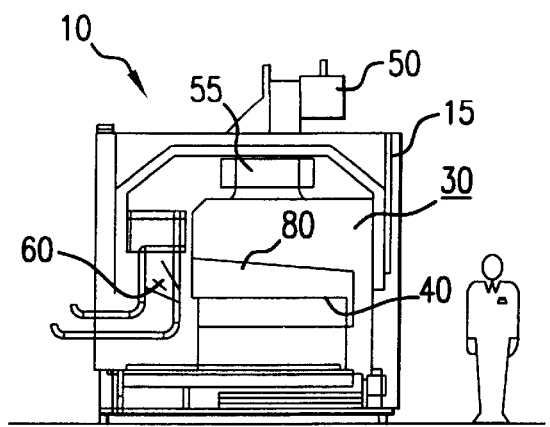
FIG. 1 is a side view of a cooking oven according to one preferred embodiment of this invention.
Figure 2:
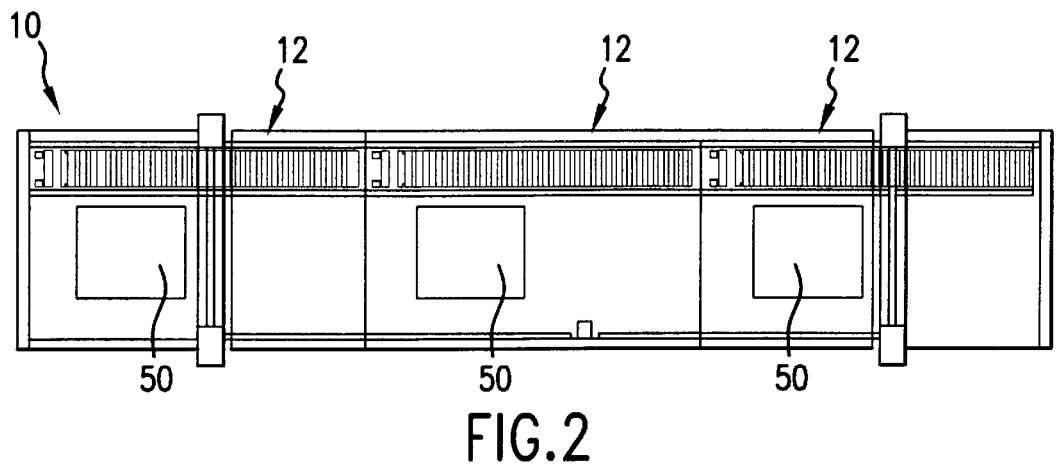
FIG. 2 is a top view of the cooking oven shown in FIG. 1.
Figure 3:
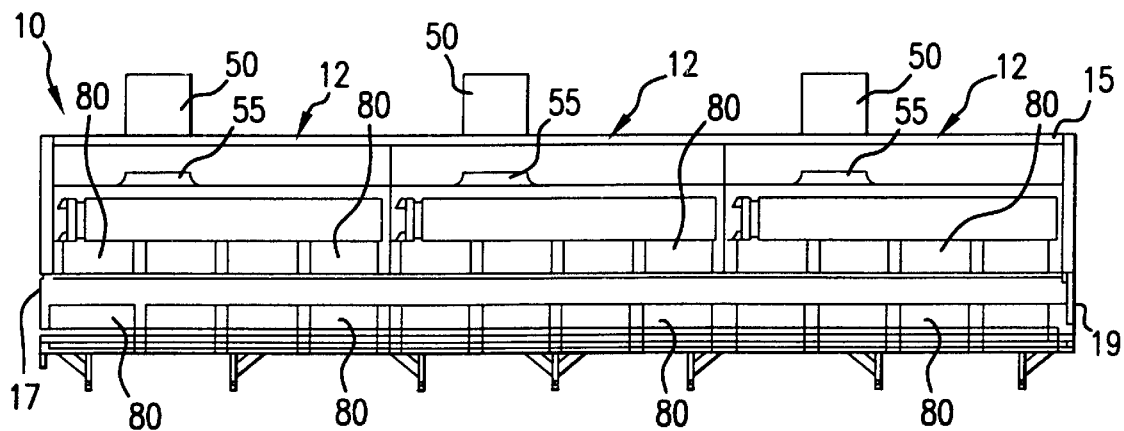
FIG. 3 is a front view of the cooking oven shown in FIG. 1.
Figure 4:
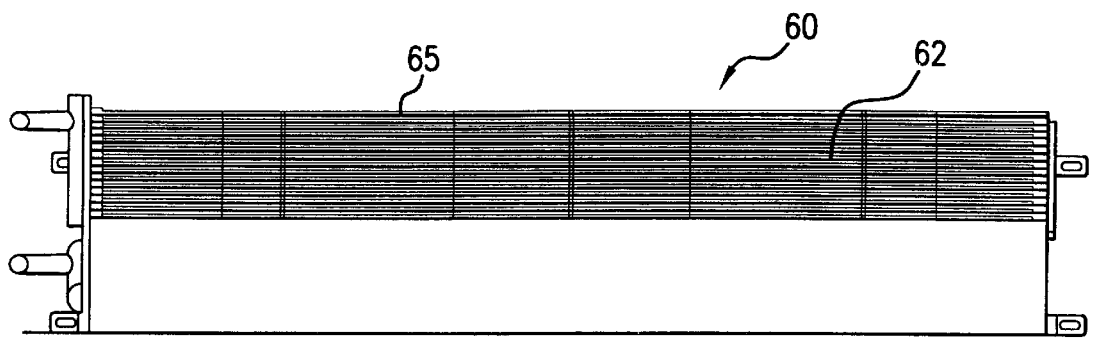
FIG. 4 is top view of a heat exchanger according to one preferred embodiment of this invention.
Figure 5:
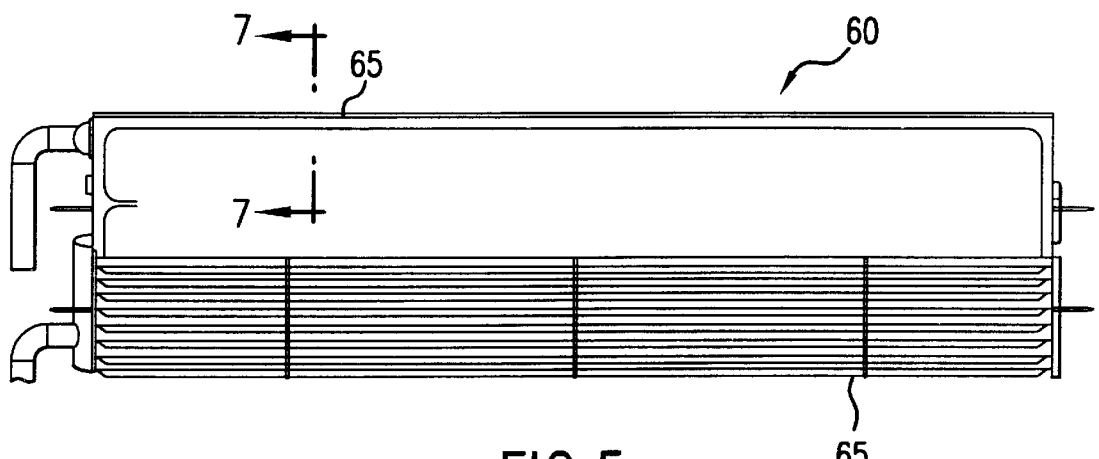
FIG. 5 is a front view of the heat exchanger shown in FIG. 4.

FIGS. 1–3 show a linear cooking oven according to one preferred embodiment of this invention. Cooking oven 10 is preferably a modular oven which may have any desired number of modules 12 joined together in an end-to-end relationship. Cooking oven 10 having three modules 12 is shown for purposes of illustration.

As shown, cooking oven 10 includes housing 15 having inlet 17 and outlet 19. Housing 15 encloses chamber 30, namely a cooking chamber. Conveyor 40, preferably a conveyor belt or similar device known to those having ordinary skill in the art, extends between inlet 17 and outlet 19 and through chamber 30. Conveyor 40 is preferably a pervious belt thus permitting air and liquid to flow through.

According to a preferred embodiment of this invention, conveyor 40 operates continuously whenever cooking oven 10 is in operation. Thus, cooking oven 10 may be referred to as a continuous oven. Uncooked food is loaded onto conveyor 40 continuously at inlet 17 and transported through one or more modules 12 in succession, and emerges cooked, at the outlet end of the oven. As the food passes through cooking oven 10, the individual modules 12 may operate either under the same or different cooking conditions. Since each individual module 12 contains distinct components as described herein, each individual module 12 may be tuned differently to create different cooking environments and conditions. For example, one module 12 may be operated with steam only and a subsequent module 12 may be operated with a mixture of hot air or gas and steam at a higher temperature than the first module 12. As such, according to one alternative embodiment of this invention, the first module 12 may be operated as a preheat module and a last module 12 may be operated as a cool-down module, although for greater efficiency it is preferable to preheat the food product before entering cooking oven 10 and cool down the food product after exiting cooking oven 10.

Additionally, one or more modules 12 may operate with a damper system directing heated air to the upper manifold (as described below), one or more modules 12 may operate with the damper system directing heated air to the lower manifold (described below), and one or more modules 12 may operate with heated air directed to both the upper manifold and lower manifold, to provide overall optimum cooking of the food items. However, according to a preferred embodiment of this invention, each module 12 will direct heated air to the upper manifold and lower manifold equally. According to an alternative three module 12 embodiment, a first and a third module 12 will direct heated air to the upper manifold and a second module 12 will direct air to the lower manifold.

Figure 9:
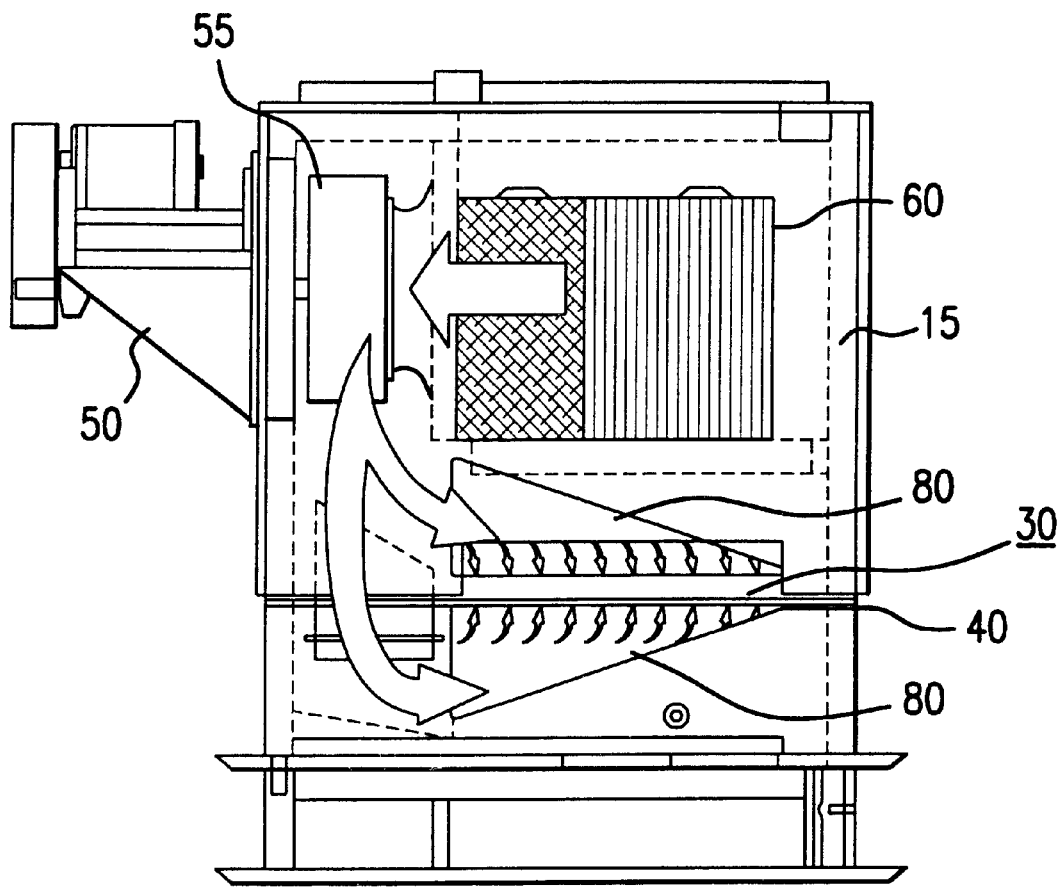
FIG. 9 is a side view of the cooking oven shown in FIG. 8.
Figure 10:
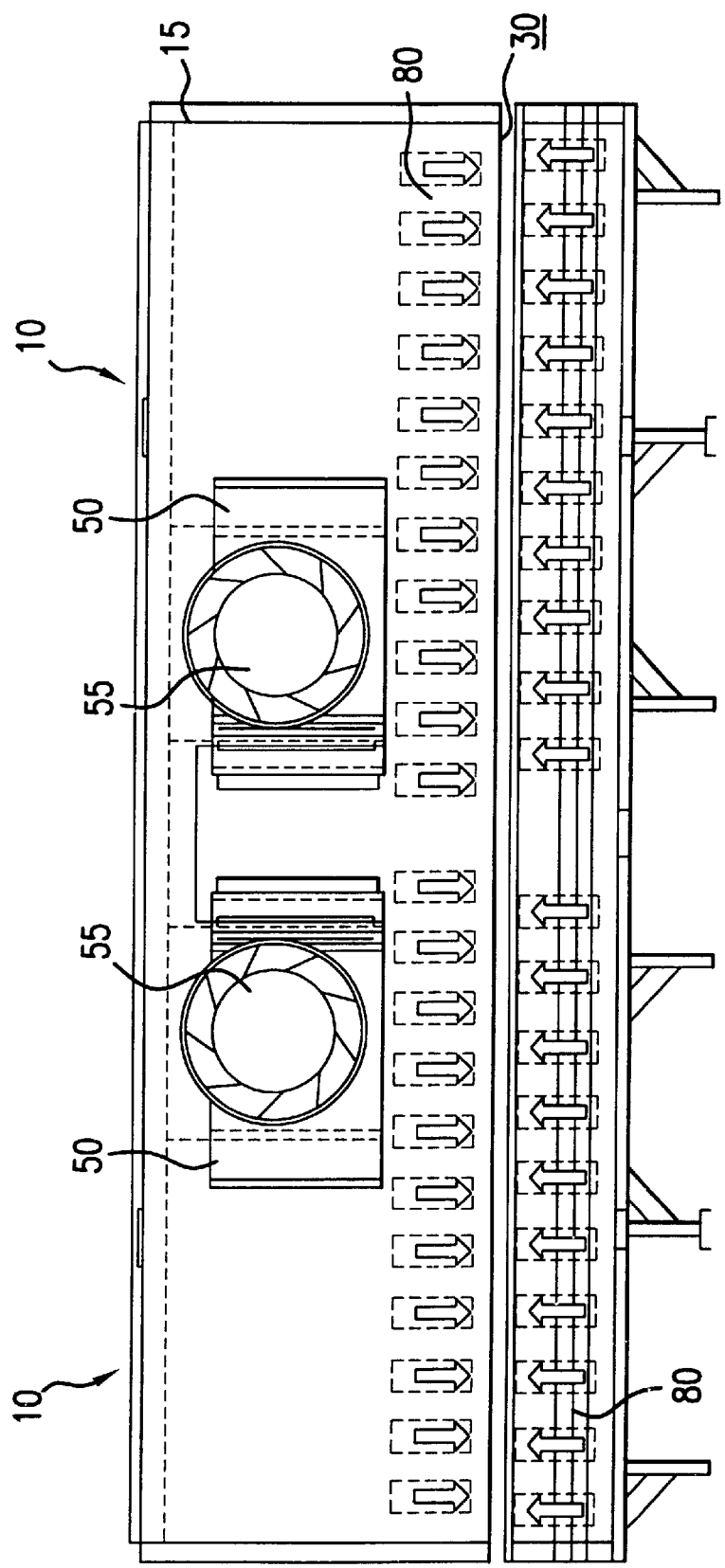
FIG. 10 is a front view of the cooking oven shown in FIG. 8.
Figure 11:
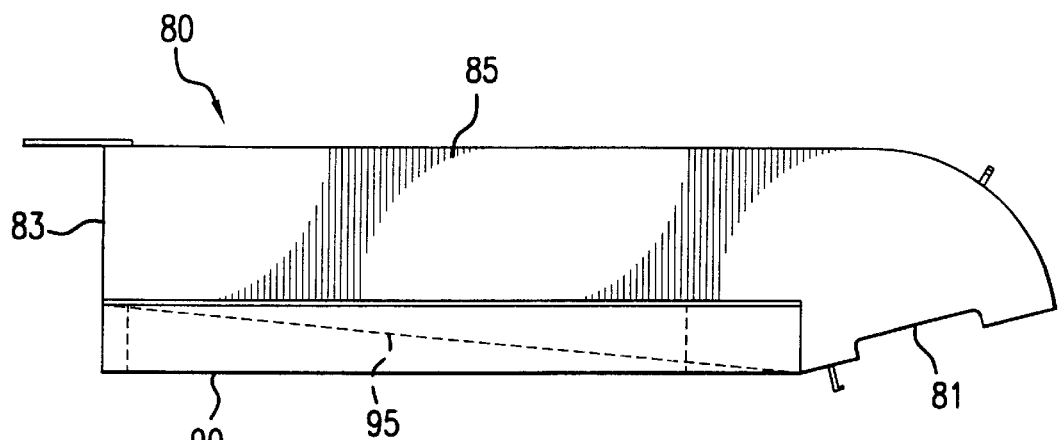
FIG. 11 is a side view of a manifold according to one preferred embodiment of this invention.
Figure 12:
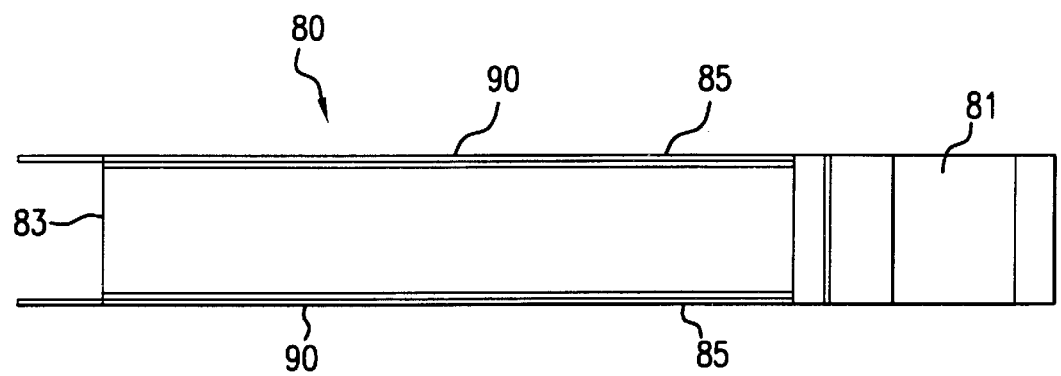
FIG. 12 is a bottom view of the manifold shown in FIG. 11.
Figure 13:
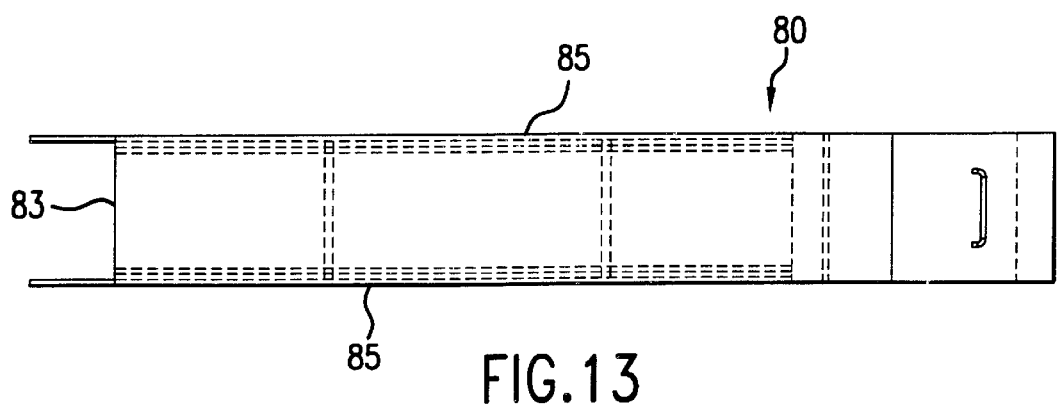
FIG. 13 is a top view of the manifold shown in FIG. 11.
Figure 14:
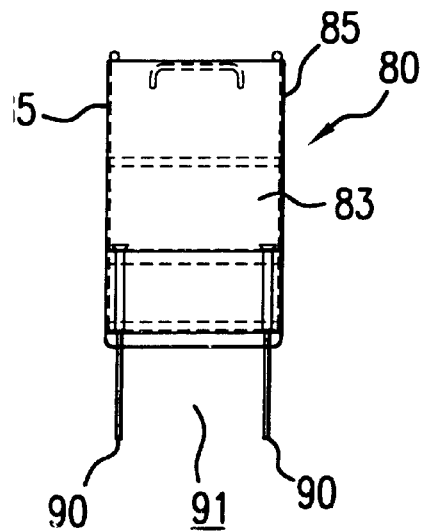
FIG. 14 is a front view of the manifold shown in FIG. 11.
Figure 15:
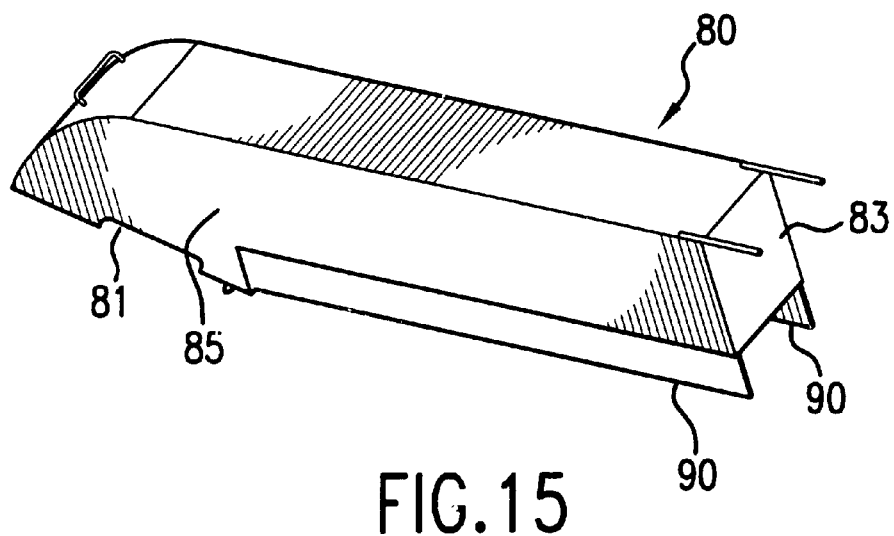
FIG. 15 is a side perspective view of the manifold shown in FIG. 11.

As shown in FIGS. 1–3, air distribution system 50 is positioned in fluid communication with chamber 30. Air distribution system 50 preferably includes one or more fans, blowers 55 or other devices for circulating conditioned air to air manifolds which upon impinging on food items returns through air distribution system 50. Air distribution system 50 may include a combination of forced draft air flow and induced air flow to generate proper and uniform conditions throughout cooking oven 10. As shown in FIGS. 9 and 10, air distribution system 50 is preferably positioned above conveyor 40.

As used in this specification and claims, air flow is defined as conditioned air, vapor, gas and/or fluid used to circulate through cooking oven 10. According to one preferred embodiment of this invention, air flow comprises steam.

Figure 6:
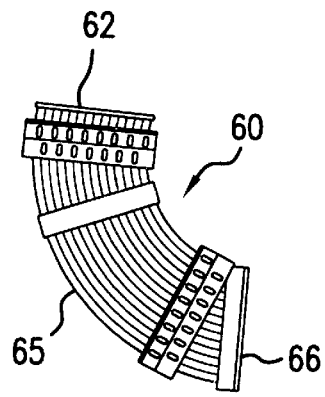
FIG. 6 is a side view of the heat exchanger shown in FIG. 4.
Figure 7:
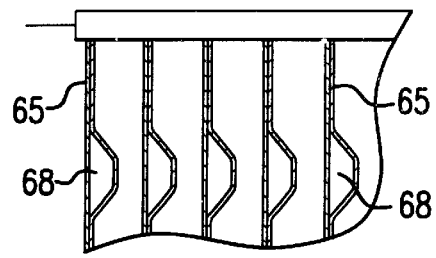
FIG. 7 is a cross-sectional view of a portion of the heat exchanger shown in FIG. 5 according to one preferred embodiment of this invention.
Figure 8:
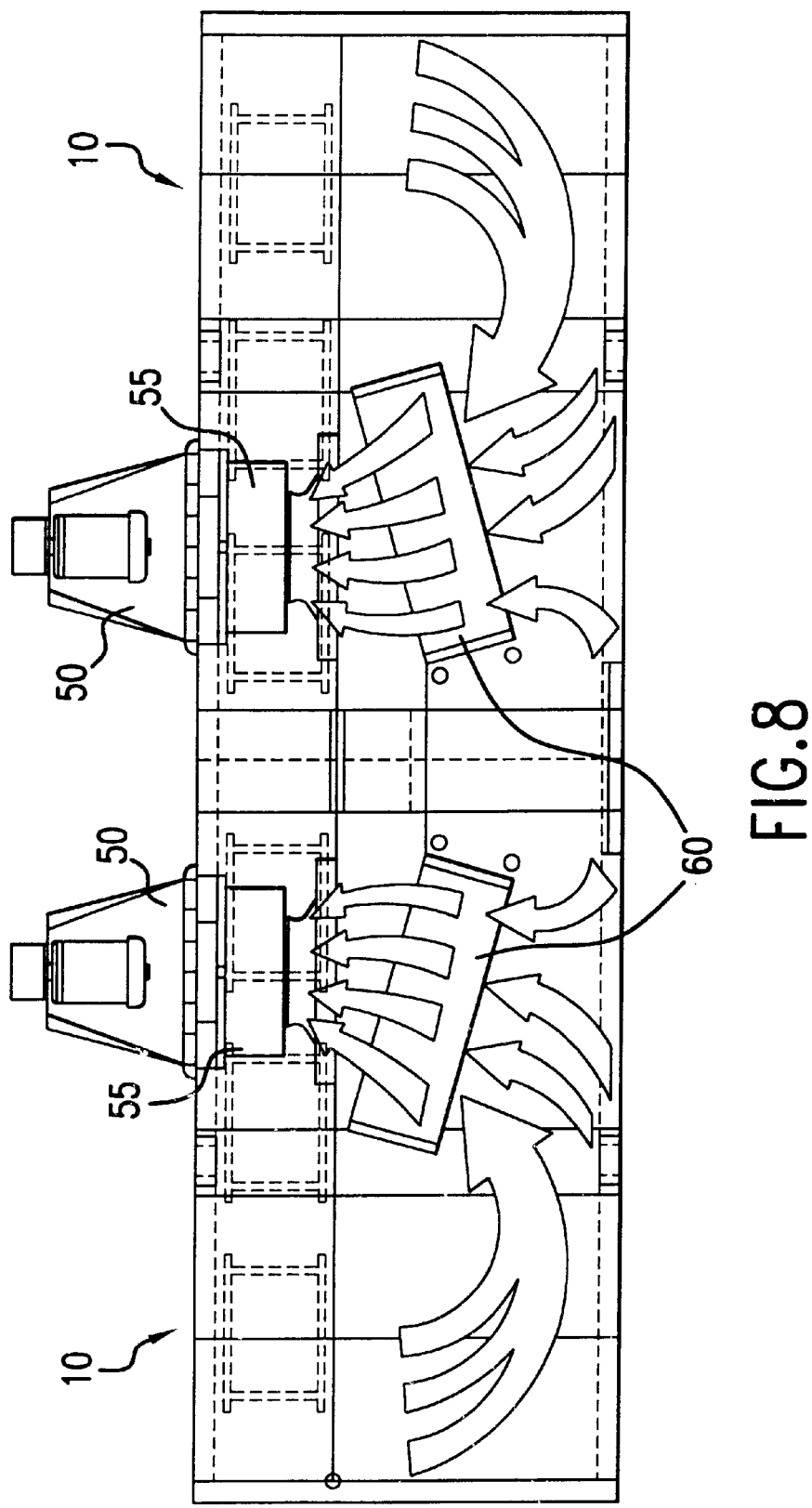
FIG. 8 is a top view of a cooking oven according to one preferred embodiment of this invention.

Curved heat exchanger 60, for instance as shown in FIGS. 4–7, is preferably positioned in fluid communication with chamber 30, as shown in FIGS. 8–10. Curved heat exchanger 60 preferably directs air from the air distribution system 50 through chamber 30 and across conveyor 40.

According to one preferred embodiment of this invention, and as shown in FIGS. 4–7, curved heat exchanger 60 includes air inlet 62 and air outlet 66. Air inlet 62 is preferably positioned in at least approximately a 90° relationship relative to air outlet 66 with at least a partially curved surface between air inlet 62 and air outlet 66.

According to one preferred embodiment of this invention, a plurality of curved plates 65 are positioned between air inlet 62 and air outlet 66. The plurality of curved plates 65 preferably extend generally parallel with respect to each other for at least a portion, if not all, of the a length of curved heat exchanger 60.

As shown in cross-section in FIG. 7, curved plates 65 may include a hollow portion or channel 68 for containing and transporting a thermal fluid, such as oil. One channel 68 may adjoin each curved plate 65 as shown. The fluid passing through channels 68 serves to elevate the heat exchanger plates 65 to a desired temperature or temperature range. A wide variety of heating fluids may be passed through channels 68, including various types of heating oils, steam or super heated steam. Alternatively, plates 65 may be heated by another means such as electrical induction.

According to one preferred embodiment of this invention, curved heat exchanger 60 may be cleaned by raising and/or lowering a hood and/or housing 15 to access curved heat exchanger 60. Alternatively, and in contrary fashion to the preferred embodiment of this invention, cooking oven 10 may include an apparatus for raising and/or lowering curved heat exchanger 60 to provide easy access for cleaning, servicing, etc.

As a result of the described configuration of cooking oven 10, curved heat exchanger 60 preferably directs air flow from a top portion of chamber 30 to a lower portion of chamber 30 and across conveyor 40. As such, curved heat exchanger 60 extends vertically from air inlet 62 and horizontally from air outlet 66. Curved heat exchanger 60 may thereby direct air flow from air inlet 62 facing an upper portion of chamber 30 and through air outlet 66 facing conveyor 40 so that air inlet 62 is positioned at approximately a right angle relative to air outlet 66.

According to one preferred embodiment of this invention, curved heat exchanger 60 is positioned outside of a vertical boundary defined by edges of conveyor 40. As a result of such a configuration, conveyor 40, and food thereon, will not be contaminated by dripping oil, water and other contaminants.

A primary advantage of curved heat exchanger 60 is its ability to direct the flow of heated air to the air manifolds in a horizontal or nearly horizontal direction while simultaneously relying on gravity and air flow to facilitate cleaning between heat exchanger plates 65. Because portions of curved heat exchanger 60 are vertical or nearly vertical, oil droplets and other contaminants which are collected between plates 65 tend to flow forward, and are discharged from the downstream end of curved heat exchanger 60 instead of accumulating between plates 65. The useful operating time, which is the time between shutdowns of cooking oven 10 for cleaning and maintenance of the heat exchanger, is greatly increased when curved heat exchanger 60 of the invention is used, as opposed to a conventional tube and fin or other heat exchangers. Also, the curved configuration of curved plates 65 allows for a more compact fit of curved heat exchanger 60 within cooking oven 10.

Curved heat exchanger 60 may be curved along the entire length of plates 65 as shown in FIG. 6. Alternatively, curved heat exchanger 60 need not be curved along the entire length of plates 65, so long as there is at least one curved portion or corner. For instance, curved plates 65 may have a straight portion and a curved portion, a straight portion and two curved portions, two straight portions and a curved portion, and so on.

Curved heat exchanger 60 may include plates 65 which are curved at an angle of 90 degrees as shown in FIG. 6. Alternatively, depending upon the application, the total angle of curvature may range between about 20–180 degrees, suitably between about 30–150 degrees, likely between about 45–135 degrees, desirably between about 60–120 degrees. The total angle of curvature may be defined as the angular difference between plates 65 at air inlet 62 and air outlet 66 of curved heat exchanger 60. This way, if curved heat exchanger 60 has more than one curved portion, the curvatures of the multiple portions are added together to arrive at the total angle of curvature for curved heat exchanger 60. The radius or radii of curvature may also vary, depending on the size and shape of cooking oven 60.

Depending upon the flow pattern of air within cooking oven 10, curved heat exchanger 60 may be positioned in various parts of cooking oven for optimum performance. To facilitate self-cleaning of curved heat exchanger 60, with the aid of gravity, air inlet 62 should be at a higher elevation than air outlet 66, as shown in FIG. 6, for instance.

Generally speaking, chamber 30 preferably includes a platform in line with the air distribution system, an air mover positioned over the platform and curved heat exchanger 60 positioned adjacent to the platform and redirecting air from the air mover across the platform. According to such an embodiment, the platform may comprise conveyor 40, cooking surface, or any other surface requiring redirected heat from an air mover and/or heat source to another location with chamber 30.

More specifically, according to one preferred embodiment of this invention, curved heat exchanger 60 is positioned adjacent conveyor 40 and directs air from above conveyor 40 through chamber 30 and preferably through a damper system and/or a plurality of manifolds, as described in more detail below, whereupon such air is impinged on the food items and the cooled return air is then delivered through the air distribution system.

Manifold System

FIGS. 11–15 show various views of air manifold 80 according to one preferred embodiment of this invention. Air manifold 80 is preferably connected with respect to cooking oven 10 so as to direct air flow from air distribution system 50 to conveyor 40.

According to one preferred embodiment of this invention, a plurality of air manifolds 80 are positioned along conveyor 40, preferably above and below conveyor 40. One or more air manifolds 80 are preferably positioned within each module 12 of cooking oven 10 thereby permitting free and compatible exchange/addition/subtraction of modules 12 within cooking oven 10.

Air manifold 80 includes a pair of sidewalls 85 extending between back wall 83 and inlet 81. A pair of outlet nozzles 90 preferably extend along a length of each air manifold 80 between back wall 83 and inlet 81.

In addition, according to an additional embodiment of this invention, an angled surface 95 constitutes a floor of air manifold 80 between the outlet nozzles 90, and extends along a length of air manifold 80. According to one preferred embodiment of this invention, the angled surface 95 extends between the outlet nozzles 90 from inlet 81 to a lower half of back wall 83 of air manifold 80. Angled surface 95 helps to ensure an even or uniform air pressure along the length of air manifold 80, resulting in more uniform velocity of air ejected along the length of nozzles 90. If angled surface 95 of air manifold 80 were horizontal instead of angular, the air pressure and velocity would be higher at locations closer to inlet 81, and lower closer to back wall 83. Angled surface 95 helps overcome the variable air pressure that would otherwise exist based on the distance from inlet 81.

Angled surface 95 extending across outlet nozzle 90 preferably equalizes a pressure of the conditioned air across angled surface 95 thereby creating a uniform air flow out of outlet nozzle 90 and across a width of conveyor 40. Uniform air flow is important for uniform cooking conditions within cooking oven 10. Depending upon the application, angled surface 95 may have an angle of about 5 to 50 degrees from horizontal, suitably about 10 to 40 degrees, desirably about 15 to 30 degrees.

As shown in the figures, according to one preferred embodiment of this invention wherein air manifolds 80 are positioned over conveyor 40, inlet 81 and the pair of outlet nozzles 90 of each air manifold 80 extend in the same direction. Therefore, air flow is directed upwardly into inlet 81 from air distribution system 50 and then across air manifold 80 and back downward through outlet nozzles 90 across the length of air manifold 80.

Each air manifold 80 includes a rectangular space 91 resembling a three-sided box, open at the bottom (toward conveyor 40), between nozzles 90. Some of the heated air which leaves nozzles 90 contacts the food items and/or conveyor 40, then deflects upward into the space 91, where it is carried back down by the venturi effect of the heated air leaving nozzles 90. This recirculation of heated air helps to mix the cooking air and facilitates more uniform cooking.

Figure 16:
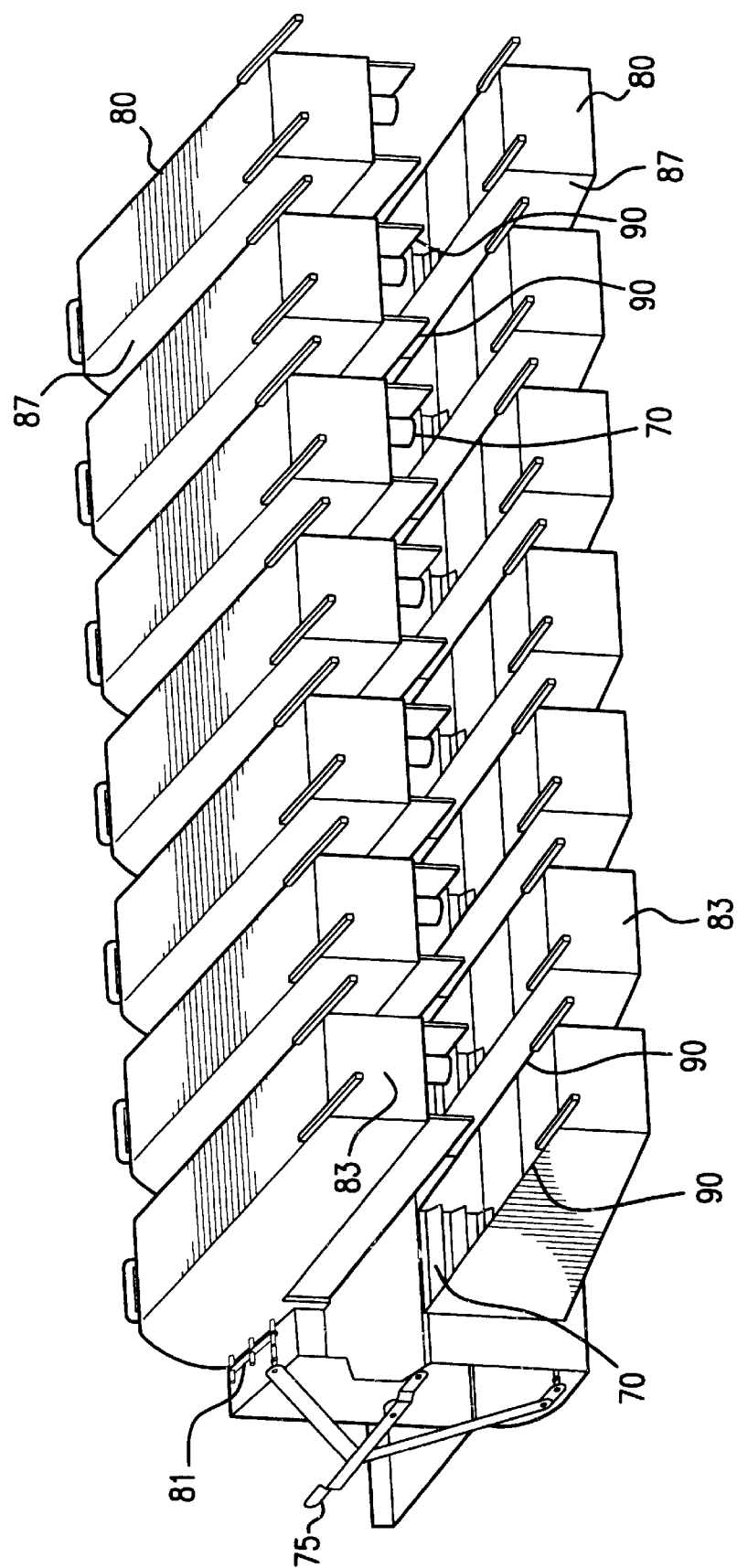
FIG. 16 is a front perspective view of a portion of a cooking oven including a plurality of manifolds according to one preferred embodiment of this invention.

In arrangements of multiple air manifolds 80, such as shown in FIG. 16, each air manifold 80 is spaced apart from each adjacent air manifold 80 to create an air gap 87 between sidewalls 85 of adjacent air manifolds 80. Return air from conveyor 40 is preferably delivered through a plurality of air gaps 87 between sidewalls 85 of adjacent air manifolds 80 in cooking oven 10.

According to one preferred embodiment of this invention, each outlet nozzle 90 comprises a narrower opening than either a width of air gap 87 or a width of air manifold 80. A relatively narrow opening of each outlet nozzle 90 results in concentrating heating and/or cooling of the food product positioned on conveyor 40.

In one particular embodiment of this invention, air manifolds 80 are spaced approximately 6" apart from each other. In such embodiment, an air manifolds 80 above conveyor 40 include outlet nozzles 90 spaced approximately 10" apart from each other within each air manifold 80. In yet another embodiment, air manifolds 80 are spaced approximately 8" apart from each other and outlet nozzles 90 are spaced approximately 8" apart from each other. Air manifolds 80 below conveyor 40 preferably include outlet nozzles 90 spaced approximately 2.5" apart from each other within each air manifold 80.

Damper System

Figure 17:
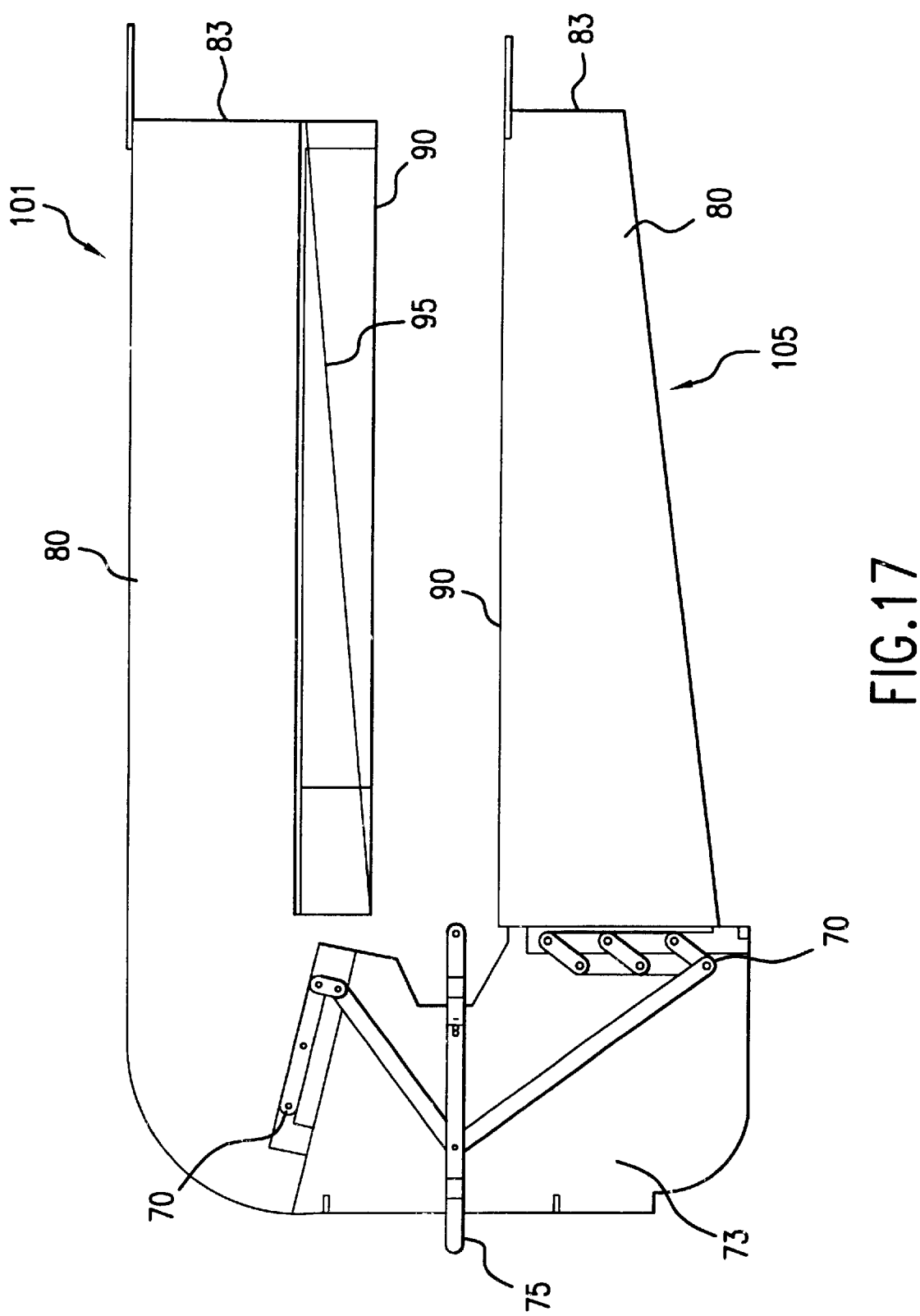
FIG. 17 is a side view of an upper manifold and a lower manifold according to one preferred embodiment of this invention.
Figure 18:
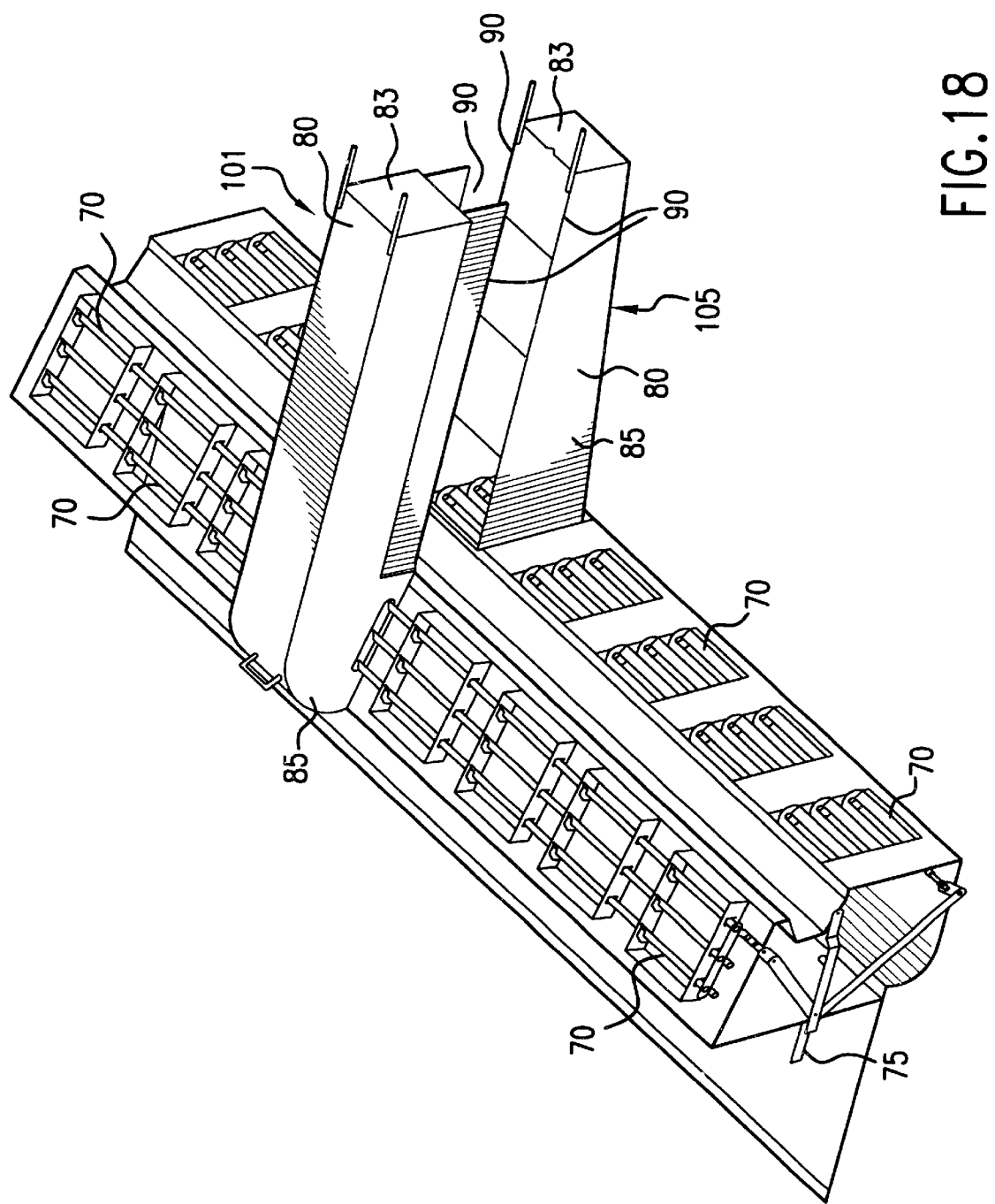
FIG. 18 is a side perspective view of a portion of a cooking oven including a plurality of louvers according to one preferred embodiment of this invention.
Figure 19:
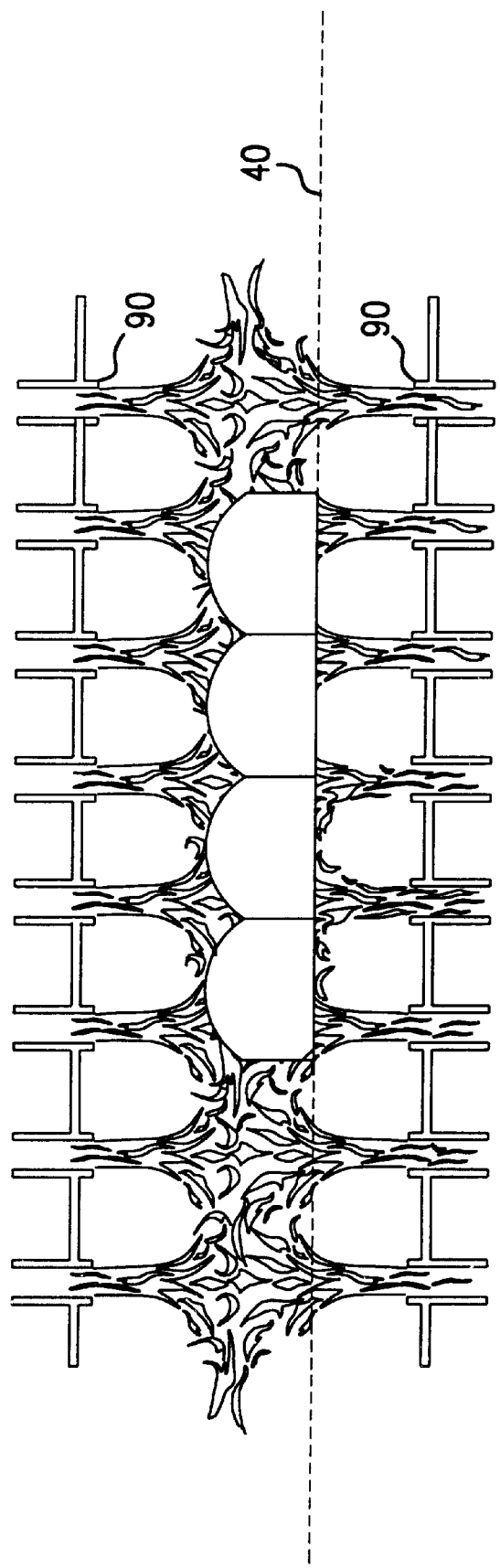
FIG. 19 is a front schematic view of the cooking process according to one preferred embodiment of this invention.

According to one preferred embodiment of this invention shown in FIGS. 17 and 18, cooking oven 10 further includes a damper system comprising a plurality of louvers 70 connected with respect to upper manifold 101 and lower manifold 105, the plurality of louvers 70 adjustable to control the air flow between the upper manifold 101 and lower manifold 105.

As shown in FIG. 18, adjustment arm 75 may be additionally connected with respect to the plurality of louvers 70. Adjustment arm 75 preferably opens at least one louver of the plurality of louvers 70 and correspondingly closes at least one other louver of the plurality of louvers 70 to control air flow between upper manifold 101 and lower manifold 105. Adjustment arm 75 may be manually controlled or electronically controlled.

As best shown in FIG. 17, inlet manifold 73 is preferably connected with respect to the plurality of louvers 70 to route air flow including return air from conveyor 40 and primary air from heat exchanger 60. Because of the described arrangement of recirculated air, this invention necessarily requires primary air from heat exchanger 60 and return air from conveyor 40. The plurality of louvers 70 preferably extend along at least a portion of a length of the conveyor 40.

As shown in FIG. 18, a first plurality of louvers 70 may be arranged in an array across upper manifold 101 and a second plurality of louvers 70 may be arranged in an array across lower manifold 105. The first plurality of louvers 70 and the second plurality of louvers 70 may be arranged in subgroups across upper manifold 101 and lower manifold 105, respectively. For instance, as shown in FIG. 18, subgroups of three louvers 70 may be positioned in an array across upper manifold 101 and/or lower manifold 105.

As a result of the described arrangement of louvers 70, air flow is directed and controlled through and between the plurality of louvers 70 connected with respect to upper manifold 101 and the lower manifold 105. Preferably, when at least one louver 70 in upper manifold 101 is opened, at least one other corresponding louver 70 is closed in lower manifold 105 thereby controlling air flow between the upper manifold 101 and the lower manifold 105. More specifically, as an array of louvers 70 is opened in upper manifold 101, a corresponding array of louvers 70 is closed in lower manifold 105.

One advantage of this arrangement is that the total heated air flow can be maintained at a constant rate in a given module 12. The damper system directes the heated air to upper manifold 101, lower manifold 105, or a desired combination of both, without changing the total amount of heated air supplied for cooking. Thus, the amount of heated air can be fixed and controlled at a predetermined rate as desired to give the optimum level of overall cooking. The damper system can be used to direct air to upper and lower manifolds 101, 105 as desired to ensure that the cooking is substantially uniform and even.

While in the foregoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of the invention.

We claim:

1. A cooking oven manifold system comprising:
    a conveyor extending through a housing;
    a plurality of air manifolds positioned above and below the conveyor, each air manifold having a pair of sidewalls extending along a length of each air manifold between a back wall and an inlet;
    a pair of outlet nozzles, each outlet nozzle of the pair of outlet nozzles extending toward the conveyor and along the length of each air manifold; and
    each air manifold spaced apart from each adjacent air manifold to create an air gap between sidewalls of adjacent air manifolds.

2. The cooking oven manifold system of claim 1 further comprising:
    an angled surface between each pair of outlet nozzles extending along a length of the air manifold.

3. The cooking oven manifold system of claim 2 wherein the angled surface extends between each pair of outlet nozzles from the inlet to a lower half of a back wall of the air manifold.

4. The cooking oven manifold system of claim 1 wherein air flow into the inlet and out of the pair of outlet nozzles of each air manifold extends in a generally common plane and in generally opposite directions.

5. The cooking oven manifold system of claim 1 wherein each outlet nozzle comprises a narrower opening than either a width of the air gap or a width of the air manifold.

6. The cooking oven manifold system of claim 1 wherein each air manifold positioned above the conveyor is configured differently from each air manifold positioned below the conveyor.

7. The cooking oven manifold system of claim 6 wherein each air manifold positioned above the conveyor includes a wider distance between outlet nozzles than each air manifold positioned below the conveyor.

8. The cooking oven manifold system of claim 5 wherein each air manifold positioned above the conveyor includes outlet nozzles having a different size than outlet nozzles in each air manifold positioned below the conveyor.

9. A method of cooking using a manifold system extending around a conveyor, the method comprising the steps of:
    arranging a plurality of air manifolds above the conveyor, each air manifold having a pair of sidewalls extending along a length between a back wall and an inlet;
    forcing conditioned air through a pair of outlet nozzles toward the conveyor, each outlet nozzle of the pair of outlet nozzles extending along the length of each air manifold;

heating food product on the conveyor with the conditioned air; and delivering return air from the conveyor through a plurality of air gaps between sidewalls of adjacent air manifolds of the plurality of air manifolds.

10. The method of claim 9 further comprising the step of:

forcing air across an angled surface along the length of each air manifold; and equalizing a pressure of the conditioned air across the angled surface extending through each outlet nozzle from the inlet to a lower half of a back wall of the manifold.

11. The method of claim 9 further comprising the step of:

arranging a second plurality of air manifolds below the conveyor.

12. The method of claim 9 wherein air flow into the inlet and out of the pair of outlet nozzles of each air manifold extend in a generally common plane and in opposite directions.

13. The method of claim 9 wherein each outlet nozzle comprises a narrower opening than either a width of the air gap or a width of the air manifold.

14. A cooking oven manifold system comprising:

a conveyor extending through a housing;

a plurality of air manifolds positioned above the conveyor, each air manifold having a pair of sidewalls extending along a length between a back wall and an inlet;

a pair of outlet nozzles, each outlet nozzle of the pair of outlet nozzles extending along the length of each air manifold, wherein air flow into the inlet and out of the pair of outlet nozzles of each air manifold generally flows in a common plane perpendicular with the conveyor and in opposite directions;

each air manifold spaced apart from each adjacent air manifold to create an air gap between sidewalls of adjacent air manifolds; and a plurality of louvers controlling the air flow through the plurality of air manifolds.

15. The cooking oven manifold system of claim 14 further comprising:

an angled surface extending along a length of each adjacent air manifold, wherein the angled surface extends through each outlet nozzle from the inlet to a lower half of a back wall of the air manifold.

16. The cooking oven manifold system of claim 14 wherein each outlet nozzle comprises a narrower opening than either a width of the air gap or a width of the air manifold.

17. The cooking oven manifold system of claim 14 further comprising a plurality of air manifolds positioned below the conveyor.

18. The cooking oven manifold system of claim 17 wherein each air manifold positioned above the conveyor is configured differently from each air manifold positioned below the conveyor.

19. The cooking oven manifold system of claim 17 wherein the plurality of louvers control air flow between the plurality of air manifolds above the conveyor and the plurality of air manifolds below the conveyor.

20. The cooking oven manifold system of claim 17 wherein each air manifold positioned above the conveyor includes different outlet nozzles than each air manifold positioned below the conveyor.

* * * * *